United States Patent [19]

Machi et al.

[11] 4,288,467
[45] Sep. 8, 1981

[54] METHOD OF PRODUCING A MEMBRANE OF GRAFT COPOLYMER

[75] Inventors: Sueo Machi, Takasaki; Isao Ishigaki, Maebashi; Takanobu Sugo, Gunma, all of Japan

[73] Assignee: Japan Atomic Energy Research Institute, Tokyo, Japan

[21] Appl. No.: 118,105

[22] Filed: Feb. 4, 1980

[30] Foreign Application Priority Data

Feb. 5, 1979 [JP] Japan .............................. 54-11995

[51] Int. Cl.³ .............................................. B05D 3/06
[52] U.S. Cl. ................................. 427/44; 204/159.15
[58] Field of Search ...................... 427/44, 35, 54.1; 204/159.14, 159.15, 159.2

[56] References Cited

U.S. PATENT DOCUMENTS

| | | | |
|---|---|---|---|
| 3,088,791 | 5/1963 | Cline et al. | 427/44 |
| 3,322,661 | 5/1967 | Yoshikawa et al. | 204/159.17 |
| 3,330,748 | 7/1967 | Lawson | 204/158 HE |
| 3,427,206 | 2/1969 | Scardaville et al. | 427/44 |
| 3,565,780 | 2/1971 | Zimmerman | 427/44 |
| 3,628,987 | 12/1971 | Nakata et al. | 427/44 |
| 3,955,014 | 5/1976 | Mostev et al. | 427/54.1 |

*Primary Examiner*—John H. Newsome
*Attorney, Agent, or Firm*—Browdy and Neimark

[57] ABSTRACT

A method of producing a membrane of graft copolymer by irradiating a polyolefine film with ionizing radiation before or simultaneously with graft copolymerizing an olefinic monomer or a mixture of an olefinic monomer and a polyene compound onto the polyolefine is disclosed. The method is characterized by graft copolymerization wherein the polyolefine base film is reciprocated between a pair of fixed reversing rollers through a mobile roller.

4 Claims, 2 Drawing Figures

METHOD OF PRODUCING A MEMBRANE OF GRAFT COPOLYMER

BACKGROUND OF THE INVENTION

1. Field of the Invention

This invention relates to a novel method of producing a membrane of graft copolymer by irradiating a polyolefin film with ionizing radiation before or simultaneously with graft copolymerizing an olefinic monomer having a functional group or a mixture of such monomer and a polyene compound onto the polyolefin. The method is characterized by graft copolymerization wherein the polyolefin base film is reciprocated between a pair of reversing rollers through a mobile roller to absorb continuously the expansion of the film that results from the graft copolymerization.

Such method assures uniform graft copolymerization and provides a membrane of graft copolymer free from wrinkles.

2. Description of the Prior Art

A rapid expansion is being seen in the use of high molecular membranes, especially those having functional groups, in the field of chemical engineering, and they have great potential as membranes for osmotic dialysis, electrodialysis, electrolysis, separators for cells, and other ion exchange membranes. Therefore, attempts are being made in various fields to manufacture functional high molecular membranes of better quality, and several methods have been proposed to date.

One known method is similar to the method of this invention in that it produces a membrane by graft copolymerizing an olefinic monomer having a functional group to a polyolefin film base. The method is superior to other known methods in that it is very simple, that it is capable of synthesizing a great many types of membranes by selecting a suitable base film and an olefinic monomer having a suitable functional group depending upon the use and object, and that it is also capable of synthesizing membranes having two or more types of functional groups. But this method often causes uneven polymerization that results in a heterogeneous membrane having many wrinkles on the surface.

SUMMARY OF THE INVENTION

Therefore, the primary object of this invention is to provide a simple and industrially very advantageous method of producing a functional high molecular membrane that is free from uneven polymerization, has completely flat surfaces and high dimensional accuracy.

DETAILED DESCRIPTION OF THE INVENTION

When a liquid monomer is graft copolymerized onto a high molecular membrane, the membrane swells and the graft copolymerization does not proceed uniformly, which gives many chances of a deformed graft copolymer being produced. If the intended product is a separator for a cell which is as thin as 0.02 to 0.03 mm, the formation of wrinkles is so noticeable that a membrane without uneven graft copolymerization is difficult to obtain. As a result of systematic studies on graft copolymerizing a liquid monomer onto an irradiated high polymer membrane, we have found that by reciprocating a polyolefin base film between a pair of reversing rollers through a mobile roller to absorb and correct continuously the expansion and wrinkles developed in the film in consequence of the grafting, a graft copolymerized membrane free from uneven polymerization and having uniform surfaces can be prepared using a base film 0.02 mm thick, 10 cm wide and 50 to 100 m long.

It has also been found that the grafting process using such reversing rollers eliminates the chances of uneven graft copolymerization and provides a membrane having no wrinkles on the surfaces, and that a base film immersed by only about a tenth to a hundredth of its overall length in a solution containing an olefinic monomer can undergo grafting at a rate substantially equal to that obtained when the entire portion of the film is immersed in the solution. This has the advantage of greatly reducing the amount of a monomer solution required.

It is to be emphasized that other grafting techniques such as that of simply immersing the base film in the monomer solution are not capable of synthesizing a thin membrane free from uneven graft copolymerization and having uniform, wrinkle-free surfaces.

The ionizing radiation to be used in the method of this invention includes X-rays, alpha-rays, beta-rays, gamma-rays, accelerated electron beams and other types of ionizing radiation.

The polyolefin base film includes those made of a hydrocarbon polyolefin such as polyethylene or polypropylene, a fluorine-containing polyolefin such as polytetrafluoroethylene or a copolymerized product thereof, polyethylene terephthalate, and other polyolefin.

The olefin having a functional group includes acrylic acid, methacrylic acid, esters thereof, hydroxystyrenes, acryloxystyrenes, and all other functional olefins which can be grafted onto the polyolefin film. Examples of the polyene compound are those having at least two polymerizable double bonds in the molecule, such as divinylbenzene, isoprene, butadiene, cyclopentadiene, ethylene glycol, diol esters of acrylic acid or methacrylic acid, divinyl ester of adipic acid, polyethylene glycol dimethacrylate, and polyethylene glycol diacrylate.

DETAILED DESCRIPTION OF THE PREFERRED EMBODIMENTS

Figure 1:
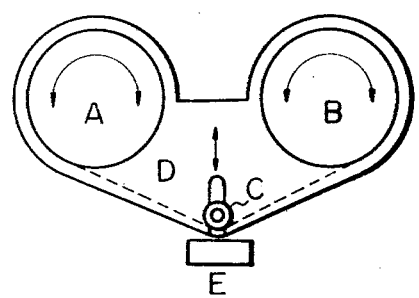
FIG. 1 is a schematic side view illustrating the operating theory of an apparatus to be used in the practice of this invention according to Examples 1 and 2.

According to this invention, grafting may either follow or be simultaneous with exposure to ionizing radiation. In one preferred embodiment of the method of this invention which is illustrated in FIG. 1, a polyolefin film D is first irradiated with ionizing radiation for a dose of about $1 \times 10_5$ rads to $5 \times 10^7$ rads and then wound up on a roll A that is driven by an external power to move the film. After the winding of the roll A has been stopped by a limit switch (with a dial gauge) on the driving axle of the roll, the terminating end of the film is placed on a roll B with a magnet-containing mobile roll C that applies a constant tension to the film by its weight or by means of a spring being between the rolls A and B. As the roll B revolves, the mobile roll C goes up whereupon a magnetic access relay E operates to stop the roll B. This causes the roll A to revolve, whereas the mobile roll C is contacted by the access relay E to stop the roll A. At the time when the dial gauge of roll A has registered zero, the film D starts to be rewound by driving the roll in an identical manner to that described above except that the film D unwinds from roll B and winds onto roll A. During this rewinding operation, the dial gauge on the driving axle of roll B compensates for the elongation of film D due to grafting and such elongation is absorbed. In addition, by controlling the weight of the mobile roll, the film can be taken up by either roll A or B under a constant tension. Reciprocating the film between the two rolls in the manner described above provides a membrane free from uneven grafting and having uniform surfaces.

Figure 2:
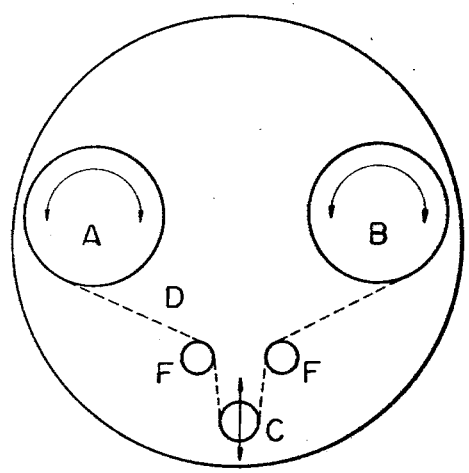
FIG. 2 is also a schematic side view for an apparatus which is to be used in the practice of this invention according to Example 3.

Another embodiment of this invention is illustrated in FIG. 2 which uses the same operating theory as FIG. 1 except that no access relay is used and that instead, the rolls A and B are driven by a torque motor to take up the film D under a constant tension. In FIG. 2, guide rolls are identified by F.

Observation under microscope or with X-ray microanalyzer showed that the membrane produced by grafting according to either embodiment of this invention had higher degree of uniformity in graft distribution and surface flatness than with the conventional membrane of graft copolymer produced by simply immersing a polyolefin film in a monomer solution.

The method of this invention is now described in greater detail by reference to the following examples which are given for illustrative purposes only and are by no means intended to limit the scope of the invention.

EXAMPLE 1

A high-density polyethylene film (20 μm thick, 10 cm wide and 20 m long) in a polyethylene bag was irradiated with electron beams to give a total dose of 20 Mrads from a resonant transformer accelerator (2 MeV, 1 mA) in a nitrogen atmosphere at room temperature. The irradiated polyethylene film was set in an apparatus as shown in FIG. 1 and passed through a vessel containing a solution that comprised a 50 wt% aqueous solution of acrylic acid containing 0.25 % of Mohr's salt. The oxygen content of the solution had been rendered less than 0.1 ppm. While the container was held in a nitrogen atmosphere, the film was subjected to a 5-hour graft copolymerization at 25° C. by being reciprocated between a pair of rolls at a rate of 10 m/min. After the grafting, the unpolymerized monomer and homopolymer were washed and extracted with water from the graft copolymerized film, and dried. The resulting membrane had a degree of grafting of 113% as calculated from the increase in its weight. The membrane was 30% longer and 13% wider than the polyethylene film from which it was produced. The membrane had smooth surfaces with no detectable wrinkles formed therein. The degree of grafting was measured at 10 points of the membrane selected randomly in its longitudinal direction, and it was in the range of from 111 to 113.5%.

The procedure described above was repeated except that a polyethylene film (20 μm thick, 10 cm wide and 5 m long) rolled into a cylinder 10 cm in diameter was immersed in the monomer solution. The degree of grafting of the resulting membrane was 95% and it had a great number of wrinkles formed therein that made its transparency differ from place to place. Measurement of the degree of grafting along the longitudinal direction of the membrane revealed a portion whose degree of grafting was less than 10%, indicating the occurrence of uneven grafting in the membrane.

EXAMPLE 2

The procedure of Example 1 was repeated to graft copolymerize a low-density polyethylene film (20 μm thick, 10 cm wide and 50 m long). The resulting membrane of graft polymer had a degree of grafting of 95%. The membrane was 10% wider and 28% longer than the polyethylene film from which it was produced. It had smooth surfaces with no detectable wrinkles formed therein. The distribution of the degree of grafting in the longitudinal direction of the membrane was very narrow; the values measured at 10 points selected randomly in that direction were in the range of from 94 to 97%.

As a control, a polyethylene film (20 μm thick, 10 cm wide and 5 m long) rolled into a cylinder 10 cm in diameter was graft copolymerized by being simply immersed in a monomer solution. The resulting membrane had a great number of wrinkles formed therein, and it was clear that uneven grafting occurred in the membrane.

EXAMPLE 3

The procedure of Example 1 was repeated except that a low-density polyethylene film (50 μm thick, 10 cm wide and 15 m long) was graft copolymerized using an apparatus as shown in FIG. 2. The resulting membrane of graft copolymer had a degree of grafting of 100% and its surfaces were smooth with no detectable wrinkles formed therein. The membrane was 5% wider and 20% longer than the polyethylene film from which it was produced. The distribution of the degree of grafting in the longitudinal direction of the membrane was within ±3%.

What is claimed is:

1. A method of producing a membrane of graft copolymer by irradiating a polyolefin film with ionizing radiation before or simultaneously with graft copolymerizing an olefinic monomer or a mixture of olefinic monomer and a polyene compound onto the polyolefin, said method being characterized by graft copolymerization wherein the polyolefin film is transported in a forward direction from a fixed reversing roller to another fixed reversing roller via an intermediate mobile roller and when the film comes to its end, it is transported in a reverse direction, and said mobile roller is moved in a direction in which it applies a stretching load on the film being transported.

2. In a method of producing a graft polymerized membrane comprising irradiating a polyolefin film with ionizing radiation and contacting said polyolefin film with an olefinic monomer or a mixture of an olefinic monomer and a polyene compound to effect graft copolymerization of the monomer onto the polyolefin film, the improvement wherein
    wrinkles are avoided and expansion of the film is compensated for during the graft polymerization by continuously absorbing the expansion of the film that results from the graft copolymerization, said continuous absorbing of the expansion being carried out by applying tension to the film.

3. A method according to claim 2 wherein said tension is applied by reciprocating said polyolefin film between a pair of reversing rollers through an intermediate mobile roller.

4. A method according to claim 2 wherein said polyolefin film has a length of approximately 50 to 100 meters, and wherein said film is immersed into said olefinic monomer, present in solution form, in a sequential manner and along a length thereof corresponding to approximately 1/10th to 1/100th of the total length thereof, simultaneously with the application of said tension.

* * * * *